Figure 1:
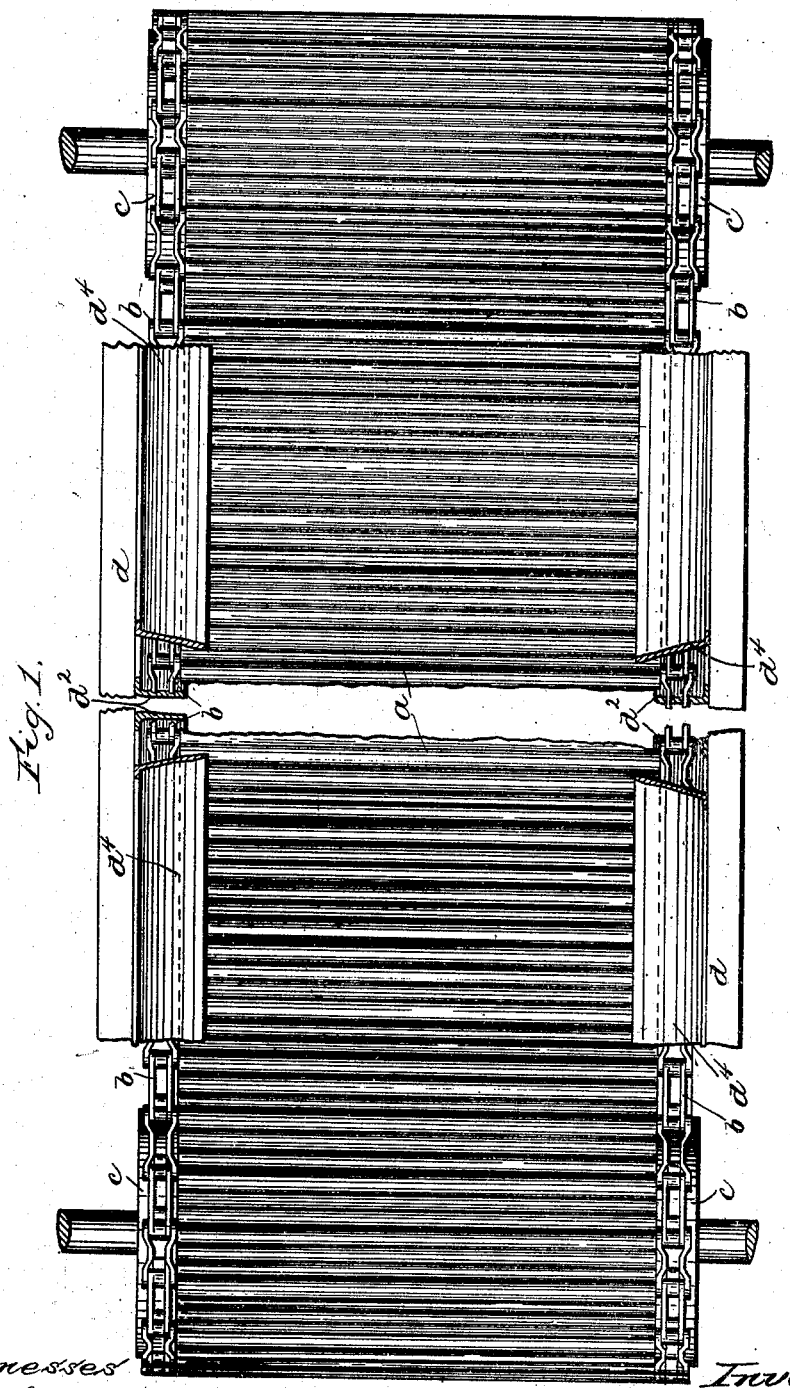

(No Model.)

J. GUILER, Jr.
CONVEYER.

No. 561,582. Patented June 9, 1896.

Witnesses
Jas. J. Maloney.
T. J. Livermore.

Inventor.
James Guiler, Jr.
by Jos. P. Livermore
Att'y.

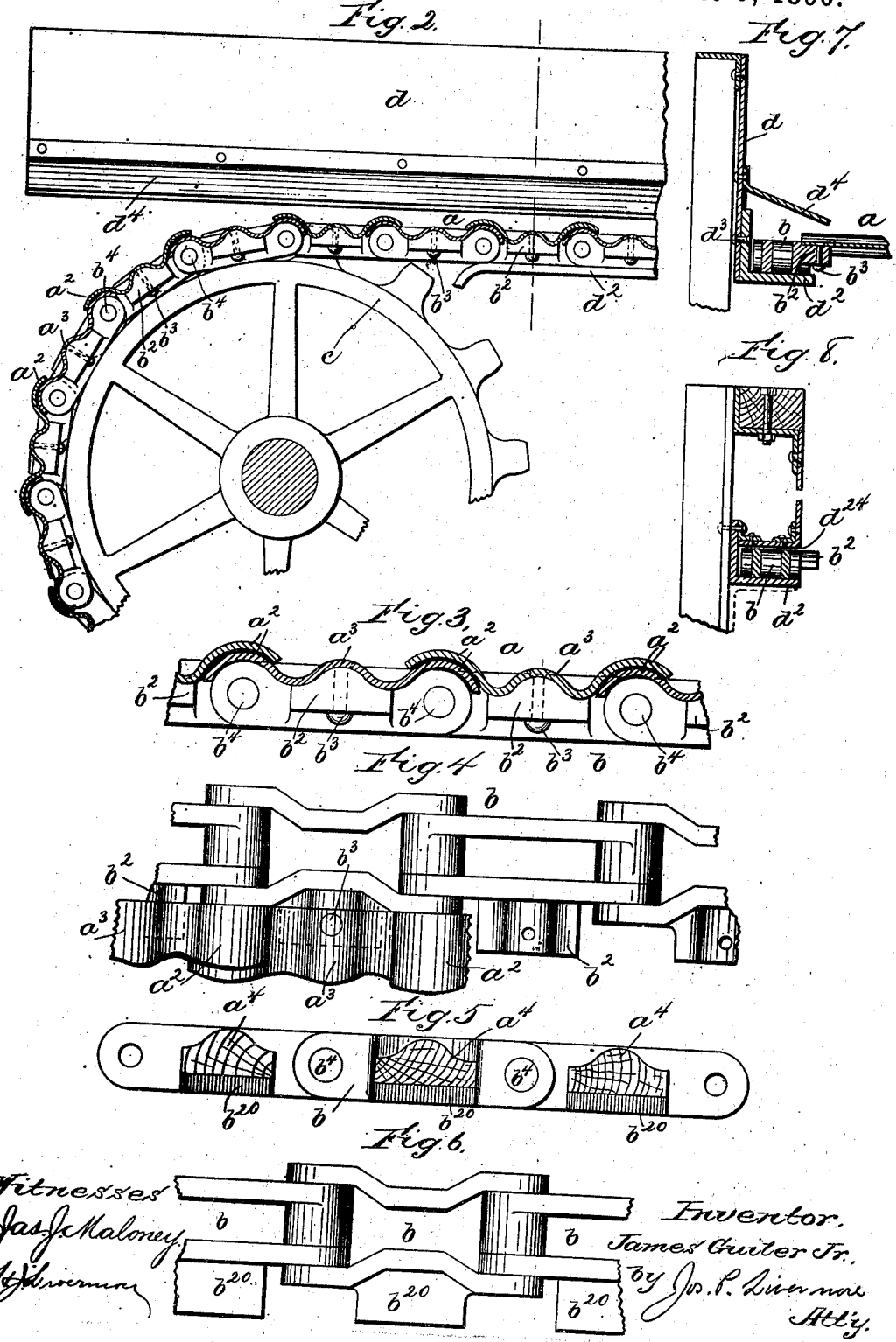

UNITED STATES PATENT OFFICE.

JAMES GUILER, JR., OF BOSTON, MASSACHUSETTS, ASSIGNOR OF ONE-HALF TO OSCAR B. STILLMAN, OF NATICK, MASSACHUSETTS.

CONVEYER.

SPECIFICATION forming part of Letters Patent No. 561,582, dated June 9, 1896.

Application filed April 25, 1895. Serial No. 547,182. (No model.)

*To all whom it may concern:*

Be it known that I, JAMES GUILER, Jr., of Boston, county of Suffolk, State of Massachusetts, have invented an Improvement in Conveyers, of which the following description, in connection with the accompanying drawings, is a specification, like letters on the drawings representing like parts:

The present invention relates to a belt conveyer or conveying apparatus in which a continuously-moving flexible surface or support for the material to be conveyed is carried upon and propelled by pulleys.

The object of the invention is to produce a simple and durable conveyer suitable for use with moist materials, such as crushed sugarcane, bagasse, or moist sugar, and capable of carrying the same up a considerable incline.

The invention is embodied in a conveyer having supporting-plates composed of corrugated or sinuous sheet metal and a pair of drive-chains, the links of which chains are each provided on one side with a laterally-projecting lug. Each supporting-plate is of a length equal to the distance between the chains and a width equal to the length of the chain-link, and is securely fastened by bolts or rivets at its ends to the lugs on the chains, the longitudinal corrugations at the edges of each supporting-plate being curved concentrically with the axis of the connection between the chain-links, the said edge corrugation of one plate overlapping the corresponding edge corrugation of the adjoining plate, so that the entire series of plates form a continuous surface, lap-jointed coaxially with the chain-links, and presenting uniform transverse corrugations throughout the entire length of the conveyer. The chains are preferably supported on guideways extending longitudinally from one sprocket to the next, and are covered by projections from side walls which may be provided to confine the load to the conveyer, so that the material dumped on the conveyer between the said walls will not foul the chains or fall off over the side edges of the conveying-surface.

Figure 1 is a top plan view of the apparatus as a whole with parts broken away to show the construction of certain details. Fig. 2 is a longitudinal section taken through the middle of the conveying-surface and showing in elevation the inner side of one of the chains and a portion of the sprocket. Fig. 3 is a similar section of a small portion of the conveyer, somewhat enlarged. Fig. 4 is a top plan view of one of the chains, showing the preferred method of connecting the conveying-surface thereto. Figs. 5 and 6 are respectively side and top views of a portion of the chain embodying a slight modification; Fig. 7, a transverse vertical section through one side of the conveyer, showing a form of guide-support and protector for the chain; and Fig. 8, a similar view showing a modification thereof.

Referring to Fig. 1, the conveyer consists of a series of corrugated strips or cross-plates $a$, supported at their ends upon endless chains $b$, parallel to each other and running upon sprockets $c$, the said chains and sprockets being of any suitable or usual construction except that each link of the chain is provided on one side with a supporting lug or extension $b^2$, (best shown in Figs. 3 and 4,) to which extensions the ends of the corrugated strips $a$ are secured, as by a bolt or rivet $b^3$. The said projections $b^2$ are shown as extending from the inner side of each link midway between the pivots $b^4$, by which the links of the chain are connected together, while the strips connected thereto are of a width longitudinally of the chain substantially equal to the length of the chain-link, including the parts that encircle the connecting-pivots, and thus extend in each direction to a point somewhat beyond the pivots of the link to which they are connected. The curvature of the corrugation of the said strips is such that the corrugations at the edges are substantially coaxial with the said pivots, as clearly shown in Figs. 2 and 3, so that adjacent strips overlap each other for some distance, forming, as shown in Fig. 1, a substantially continuous-moving track or support, which, however, is longitudinally flexible or provided with transverse joints coaxial with those of the chain and therefore capable of following the chain around the sprocket without affording any opening or space between adjacent cross-plates for the passage through or entrance of the material being conveyed.

As shown in Figs. 2 and 3, the supporting-lugs $b^2$ of the chain have their supporting-surface shaped to correspond with the middle corrugation of the supporting-strip, thus serving to strengthen the strip.

In order that substantially the whole width of the conveyer-surface may be utilized and the material prevented from falling off over the edges thereof during its progress, stationary side walls or guards $d$ are provided, extending longitudinally along the sides of the conveyer-surface, so that material which is to be moved may be discharged in any suitable way into the channel thus formed by the movable conveyer and the said side walls, and will be carried along by the conveyer and discharged in any suitable way, as by simply falling when the chain reaches the periphery of the sprocket. In order to support the weight of the conveyer itself and the load carried thereby without sagging, the links of the chain are adapted to run upon longitudinal tracks or supports $d^2$, (shown in Fig. 7 as extending inward from the walls $d$,) the length of said supports being substantially equal to the distance between the sprockets at the ends of the conveying-surface.

As shown in Fig. 7, the support $d^2$ consists of an angle-iron or L-shaped piece secured by rivet $d^3$ to the guard-strip $d$ of sheet metal, which is secured to the face of such planking or framework, as may be found convenient.

In order that the chain may be protected from the material thrown into the channel through which the conveyer travels, a hood or shield $d^4$ may be provided, as shown in Fig. 7, extending from the wall $d$ at a point above the chain-links to a point beyond the inner sides of said links, and preferably inclined downward somewhat from the said wall so as to shed or deflect toward the main portion of the carrier any material which may strike thereon when thrown into the channel. Where heavier or coarser material is to be conveyed—such, for example, as coal—the side wall $d$ may be made to fit closely upon the upper surface of the chain-links, or the walls between which the conveyer runs may be simply provided with longitudinal grooves $d^{24}$, in which the links of the chain run, as shown in Fig. 8. Where the apparatus is especially designed for use in sugar-refineries, the corrugated strips of sheet metal are directly connected at their ends to the projections $b^2$, as shown in Figs. 2 and 3, the stiffness of the strips being sufficient in itself to support the load which the conveyer is designed to carry. In some instances, however, where heavy material is to be conveyed, the strips may be reinforced by cross-pieces $a^4$, shown in Fig. 5 as consisting of timbers having their upper surfaces shaped to conform to the strip $a$, adapted to be supported thereon, the said cross-pieces themselves being secured to flat lugs $b^{20}$, Fig. 6, on the chain-links corresponding to the extensions $b^2$ previously described.

By the making of the supporting-plates longitudinally corrugated throughout their entire surface, (measured in the direction of the length of the conveyer,) the entire conveyer-surface is provided with substantially uniform transverse ribs or ridges which afford a very efficient tractional hold upon the loose material being conveyed, so that it may be carried up a much steeper incline than is the case where a considerable portion of the conveyer-surface is smooth.

I claim—

1. The combination with a pair of parallel sprocket-chains, each link of which is provided on one side with a lateral supporting-lug, of cross strips or plates of corrugated or sinuous sheet metal secured to said lugs, each strip being corrugated transversely throughout its entire surface and the adjacent strips having their edge corrugations coaxial with the link-joints and overlapped with the corresponding edge corrugations of the adjoining plates, substantially as and for the purpose described.

2. The combination with a pair of parallel sprocket-chains, each link of which is provided on one side with a lateral supporting lug, and cross strips or plates of corrugated or sinuous sheet metal carried by said chains, each strip being corrugated transversely throughout its entire surface and the adjacent strips having their edge corrugations coaxial with the link-joints and overlapped with the corresponding edge corrugations of the adjoining plates, of the plate-supporting and reinforcing cross-pieces supported by said lateral supporting-lugs and shaped to conform to the central corrugations of the strips or plates, substantially as and for the purpose described.

3. The combination with a pair of parallel sprocket-chains, each link of which is provided on one side with a lateral supporting-lug, and cross strips or plates of corrugated or sinuous sheet metal carried by said chains, each strip being corrugated transversely throughout its entire surface and the adjacent strips having their edge corrugations coaxial with the link-joints and overlapped with the corresponding edge corrugations of the adjoining plates, of supporting guides or tracks for said chains, and guard-walls arranged above said supporting guides or tracks and extending over the edges of the conveyer-strips, substantially as and for the purpose described.

In testimony whereof I have signed my name to this specification in the presence of two subscribing witnesses.

JAMES GUILER, JR.

Witnesses:
H. J. LIVERMORE,
M. E. HILL.